Feb. 28, 1967 G. M. MAST ETAL 3,305,942
PROJECTION SYSTEM, ESPECIALLY FOR TEACHING MACHINES
Filed May 23, 1963 6 Sheets-Sheet 2

INVENTORS
G. M. MAST,
W. A. TAYLOR &
W. K. GANNETT
BY
*Harsedell Husth*
ATTORNEY Feb. 28, 1967 G. M. MAST ETAL 3,305,942
PROJECTION SYSTEM, ESPECIALLY FOR TEACHING MACHINES
Filed May 23, 1963 6 Sheets-Sheet 3

INVENTORS
G. M. MAST,
W. A. TAYLOR &
BY W. K. GANNETT

ATTORNEY

Feb. 28, 1967  G. M. MAST ETAL  3,305,942
PROJECTION SYSTEM, ESPECIALLY FOR TEACHING MACHINES
Filed May 23, 1963  6 Sheets-Sheet 4

INVENTORS
G. M. MAST,
W. A. TAYLOR &
W. K. GANNETT
BY
ATTORNEY

INVENTORS
G. M. MAST,
W. A. TAYLOR &
W. K. GANNETT
BY
ATTORNEY

United States Patent Office 3,305,942
Patented Feb. 28, 1967

3,305,942
PROJECTION SYSTEM, ESPECIALLY FOR TEACHING MACHINES
Gifford M. Mast, Davenport, Wesley A. Taylor, Bettendorf, and Wright K. Gannett, Davenport, Iowa, assignors to Mast Development Co., Davenport, Iowa
Filed May 23, 1963, Ser. No. 282,750
31 Claims. (Cl. 35—9)

This invention relates to a projection system or apparatus and more particularly to such system or apparatus as applied to teaching machines of the character in which sequences of instructional or demonstrative formats, contained on film or the like, are projected to a screen that is a self-contained part of the apparatus, which itself is a relatively small, compact unit capable of being used by individual students or small groups of students. This application is a continuation-in-part of copending application Serial No. 179,377, filed March 13, 1962, now Patent No. 3,245,746.

One of the principal objects of the invention is to provide a relatively high-quality, low-cost machine of the character noted, which is capable of substantially trouble-free operation by even the most inexperienced users. Another principal object of the invention is to provide for the projection of one or more sequences of series of sequential frames or their equivalents, and to enable the projection of questions, for example, with masked answers which will become viewable upon sequential operation of the machine prior to the projection of a succeeding question. Still another important object of the invention is to associate this projection system with a means for recording answers and to tie in this means with the masking means so that an answer written down or otherwise recorded before the true answer is exposed on the screen cannot easily be altered when the true answer is projected. In this respect, it is an object to produce a machine that may be manufactured and sold with or without the associated answer-recording means.

A still further significant object of the invention resides in improved film-handling means including controls for the power source which operates the film transport mechanism so that the frames or their equivalents are accurately advanced and projected in sequence without any undesirable overrun by the power source. Specifically, it is an object of the invention to provide means for accelerating the termination of the film-presentation cycles accurately so that each film is accurately centered in the projection aperture or on the projection axis. It is a further object to associate the screen and answer-recording means in a convenient location, together with the control means for operating the film-transport mechanism. In association with the feature residing in the use of the answer mask means, provision is made for requiring a sequence of operation such that the next question cannot be projected until the mask means is first actuated to reveal the answer to the question being projected. When used with the answer-recording means, this prevents sequential projection of questions without some record of ascertaining whether an answer has been omitted, since the answer-recording means, or the medium used therewith, is advanced only on actuation of the mechanism to unmask the answer to the associated question, plus another advance of this medium when the next question is projected, whereby it can be determined, from the amount of answer medium used, whether answers have been omitted. The invention features the arrangement of the control in such manner that continuous operation of the film transport mechanism may be effected so as to re-roll the film that has already been used. A still further object of the invention is to associate the film transport and control mechanism with a film and film magazine system of the character set forth in the above copending application, the basic characteristic of which is that the film is contained in a magazine, rolled up in one side thereof and sequentially unrolled past a projection aperture to be re-rolled in the opposite side. In the particular case, the magazine has provision for carrying two rolls of film, and each film is "split" into two sequences, whereby unwinding one film projects, sequentially, the frames on that sequence following which the magazine is reversed and re-rolling of the first sequence is achieved while sequentially projecting the frames on the second format. The same is true of the third and fourth formats on the other film.

In association with the feature exploiting the use of an answer-recording medium, it is found expedient to use conventional adding machine paper, which is carried by a paper tray associated with the projection apparatus and which paper is automatically and sequentially unwound and presented to the user in proximity to the screen, whence the used paper is rewound on a separate spindle. The power source for driving the film transport mechanism is used as means for advancing the paper or equivalent medium. The drive between the power source and the paper take-up means includes provision for slip to compensate for the increasing diameter of the roll of used paper. The invention also features automatic disconnection and reconnection between the power source and the paper advancing means as the casing in which the system is housed is opened and closed for access to the paper tray or to the bottom of the casing itself.

A further feature of the invention resides in improved means for mounting the film magazine on the projector casing, featuring a shiftable support in the form of an "island" which carries the magazine and which also houses internally therein a lens, together with means for adjusting the lens as to focus. It is an important object to provide a compact construction in which the film transport mechanism, optical condenser, electrical means, switch actuators, and paper drive are closely associated in a unit or "package."

The foregoing and other important objects and desirable features inherent in and encompassed by the invention will become apparent as a preferred embodiment thereof is disclosed in detail in the ensuing description and accompanying drawings, the figures of which are described immediately below.

Reference will be had first to FIGURES 1 through 5 for an overall description of the apparatus, with a description of the details to be supplied after the general characteristics of the machine are pointed out.

As will be seen, the apparatus comprises essentially a housing or casing 20 having right and left hand sides 22 and 24, respectively, a rear end 26 and a front or forward portion here occupied primarily by a screen 28 to the rear or interior face of which the pictures are projected for viewing by the user or viewer from a position externally of and in front of the apparatus. Accordingly, reference to the right and left hand sides 22 and 24 respectively is made on the basis of the position of a viewer looking at the screen 28.

The casing 20 has a top or upper deck portion 30 which extends rearwardly horizontally from the transverse upper edge 32 of the front of the casing to the rear and is supplemented by an upper rear cover 34, beneath which and within the rear portion of the casing 20 is housed mechanism to be described later.

Just short of the rear end 26 of the casing 20, the deck 30 terminates at a transverse upright wall 36 within which is provided a film or projection aperture 38, the top of which is bordered by a film guide lip 40. The projection or optical axis, to be described in detail later in connection with a description of the light source and related components, extends fore and aft and passes through the aperture 38, as well as being centered in an upper relatively small housing or "island" 42, within which are located further optical components which ultimately direct the projected picture to the rear interior face of the screen 28, which may be typically translucent and of known construction. For present purposes, the function of the island 42 as a supporting means for a film magazine 44 will be discussed.

Figure 1:
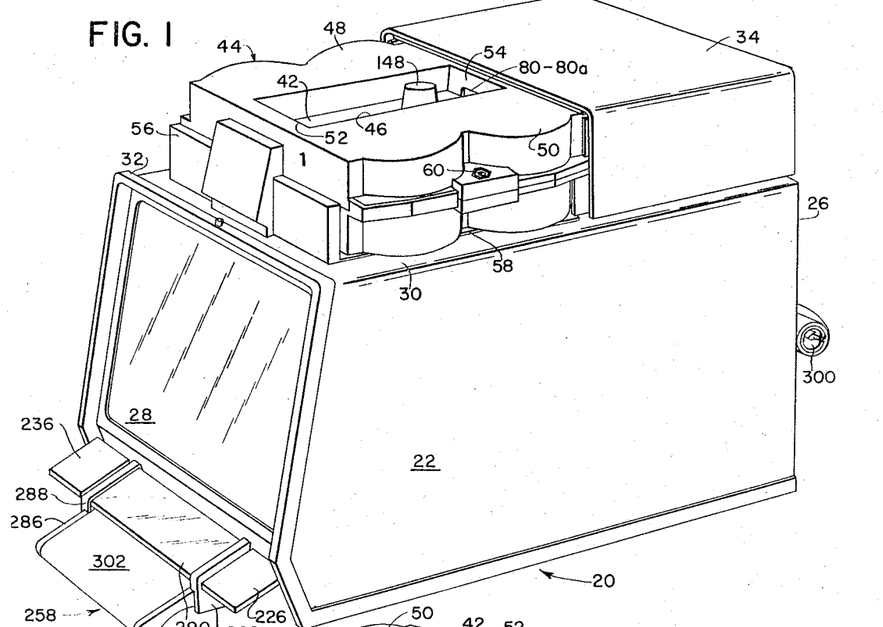
FIG. 1 is a perspective showing the complete machine as assembled with the film magazine.
Figure 9:
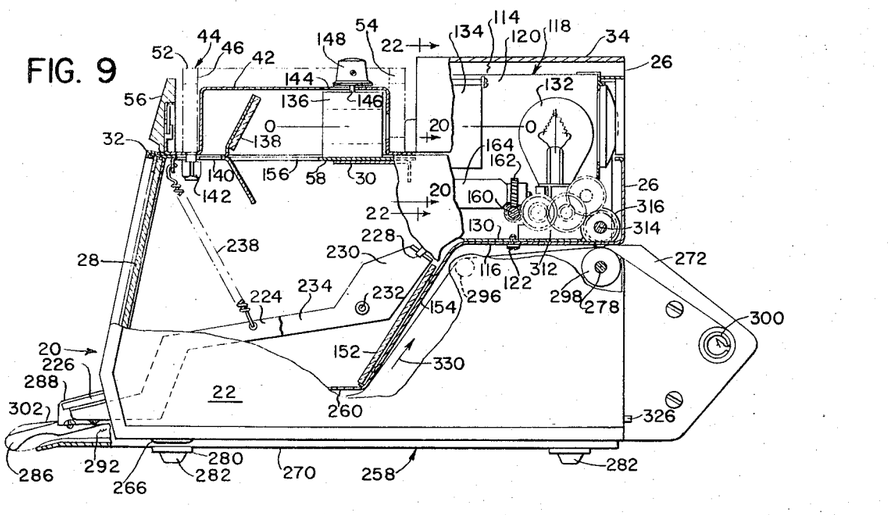
FIG. 9 is a longitudinal section, with portions broken away, of the machine shown in FIG. 1.

An best shown in FIG. 1, the magazine is in the form of a generally box-like structure having a central rectangular opening 46 which has a relatively close fit with the island 42. The magazine has opposite side portions 48 and 50 joined by transverse portions 52 and 54. In the position of the magazine as shown in the drawings, the transverse portion 54 is to the rear and lies closely proximate to and parallel with the wall 36 at the rear end of the deck 30, and the other transverse portion 52 is located just rearwardly of an upstanding portion 56 at the front end of but not rigid on the deck 30. The portion 56 is rather part of a secondary deck 58 which is mounted on the deck 30 for limited fore-and-aft shifting; as will appear subsequently. The island 42 is also carried by the secondary deck 58 so that the entire structure 56–58–42 is shiftable as aforesaid. Before the magazine 44 is mounted on the island 42, the structure just referred to is shifted forwardly (FIG. 9). After the magazine is mounted the structure, together with the magazine, is shifted rearwardly (FIG. 7), which brings into correct association, in a manner to be described below, the film carried by the transverse magazine portion 54 and the film aperture 38, as well as correcting the relationship between the film guide lip 40 and the film.

Figures 4, 5:
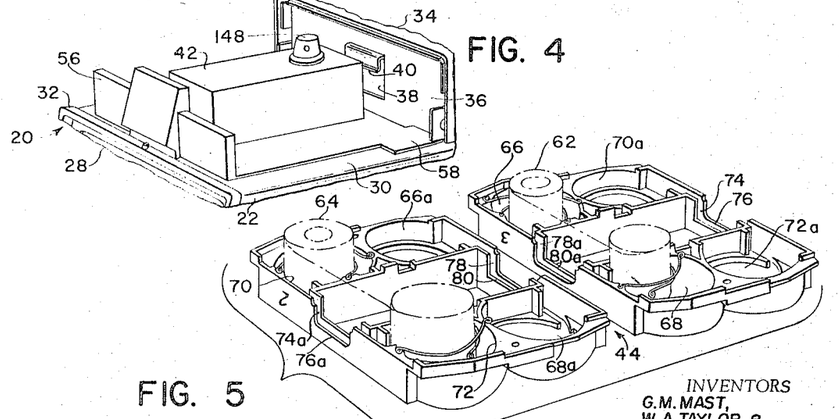
FIG. 4 is a fragmentary perspective, on a somewhat reduced scale, showing the upper portion of the machine with the magazine removed.
FIG. 5 is an "exploded" perspective showing the two halves of the magazine in separated relationship.
Figure 19:
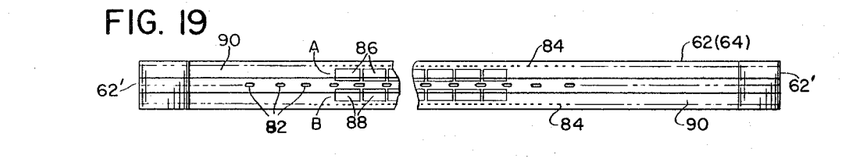
FIG. 19 is a reduced-scale view of the film.

As best shown in FIG. 5 and as shown in the copending application referred to above, the magazine is made up of two halves (here called "upper" and "lower" for convenience) symmetrical for all practical purposes about a transverse horizontal median plane. In normal use, the two halves are securely fastened together, as by screws 60, and there is no need to separate these halves except to load film. When the two halves are apart, they may be loaded with film, as at 62 and 64. The film 62 is rolled up in a pocket 66 at the side 48 of the top half (right side of FIG. 5) of the magazine 44, and its free end is rolled to a few turns in the opposite pocket 68 of that half. Opposite ends of the film may be rolled into tubular portions 62' and fastened in that status to facilitate handling (FIG. 19). The other film 64 is similarly located relative to pockets 70 and 72 in the bottom half of the magazine. As will be seen, each half of the magazine is substantially half the height of a roll of film so that when the two halves are put together, which may be here comprehended by noting that when the top half is inverted from its FIG. 5 position and placed on top of the bottom half, the film 62 that projects beyond the horizontal level of the median plane of the upper half will be accommodated by corresponding pockets 66a and 68a in the other magazine half; similarly, the remaining portions of the film 64 will be accommodated by pockets 70a and 72a in the top half of the magazine.

The top half of the magazine has therein between the pockets 70a and 72a a film track or guide portion 74 and centrally between these pockets is a three-sided notch or opening 76. Like components occur respectively at 78 and 80 in the rear wall of the forward or bottom half of the magazine. When the two halves are assembled, the portions 74 and 76 cooperate with symmetrically arranged portions 74a and 76a to provide the transverse front portion 52 of the magazine. Likewise, similar cooperation occurs between the portions 78 and 80 and portions 78a and 80a on the upper magazine half to establish the rear transverse portion 54. Hence, and looking now at FIG. 7, it will be seen that the film track is established at 78–78a and the notches 80 and 80a establish a rectangular opening having its lower half in substantial register with the aperture 38 in the wall 36. Light projected forwardly through the aperture 38 from behind the wall 36 passes through the lower half of the opening 80–80a and through the corresponding half-frame of film in register therewith. When the magazine is inverted, the lower opening-half and frame-half of course become uppermost and the previous upper parts become lowermost.

Figure 7:
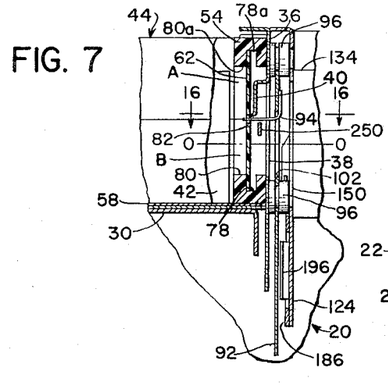
FIG. 7 is a fragmentary section taken generally on the line 7—7 of FIG. 6.

By means of film transport mechanism to be described below, the film 62, which will be that projected with the magazine in the position of FIGS. 1 and 7, is sequentially unwound from the pocket 66–66a into the pocket 68–68a. It will be seen that if the magazine is removed and turned about a fore-and-aft axis and replaced on the island 42, the re-rolled film in the pocket 68–68a is ready to be unwound to the pocket 66–66a. In other words, the film is unwound from one side of the magazine to the other in one position of the magazine and is rewound in the opposite direction when the magazine is reversed. It will be further apparent that the magazine is also reversible about a transverse horizontal axis or about a vertical axis so that the film 64 occupies the position previously occupied by the film 62; that is to say, the front portion 52 of the magazine now becomes the rear portion. Consequently, the film 64 may be unwound from one side of the magazine to the other and, when the magazine is reversed about a fore-and-aft axis, may be unwound to the opposite side. Therefore, the magazine and film system lends itself to the use of two sequences per film, giving a total of four sequences. Since the magazine is capable of assuming four positions on the island 42, the four sequences can be projected, one at a time, according to the position of the magazine. To facilitate this, the magazine may be numbered. For example, in the upper right hand corner of the magazine 44 in FIG. 1 the numeral "1" will be seen. This means that sequence number one is in position to be projected. Hidden by the front portion 56 in FIG. 1 but visible in FIG. 5 is the numeral "2," but appearing upside down. In FIG. 1, if the numeral "2" could be seen, it would be diagonally downwardly and to the left of FIG. 1 and upside down. Hence, if the magazine is removed and turned 180° about its fore-and-aft axis, the numerals "1" and "2" would change positions and the numeral "2," right side up, would be seen in the position occupied by numeral "1" in FIG. 1. This would mean that the other half of film 62 is capable of being projected. Similar numerals "3" and "4" occur on the rear side 54 of the magazine. The numeral "3" (upside down) is visible on the rear or upper half of the magazine in FIG. 5. The numeral "4," if it could be seen in the drawings, appears on the rear side of the magazine just rearwardly of the pocket 68a.

Figure 18:
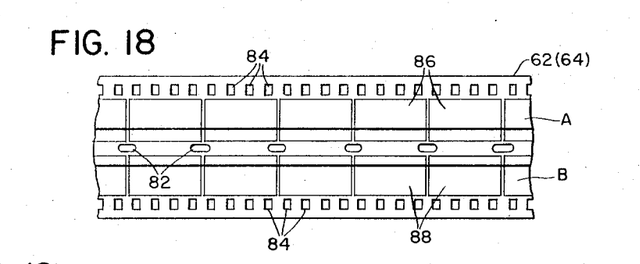
FIG. 18 is an enlarged view of a portion of the film.

FIGS. 18 and 19 best show the details of the film involved, and for purposes of exposition, reference will be had to the film 62, noting, however, that the films are identical except, of course, for format. The film shown is illustrated as typically 35 mm. size, but having two parallel sequences, identified as A and B, respectively, at opposite sides of the longitudinal center line of the film; and this center area is provided with a plurality of perforations or openings 82 for association with film transport mechanism to be described subsequently. In addition to the perforations 82, the film has the usual perforations at 84 along its opposite edges. These are used for processing the film, with frames in register with the perforations, by conventional methods. The sequences each contain a series of frames, 86 for the format A and 88 for the format B. Each sequence terminates short of the end of the film so as to leave opposite leader portions 90, it being further noted that the center perforations 82 extend past the frames and into these leader portions. These portions provide for ease in handling, particularly when rolling up the film for insertion in the magazine. Since the perforations 82 extend beyond opposite ends of the sequences of frames, the film may easily be properly oriented while still insuring projection of the first frame in each format. In a commercial embodiment, it is contemplated that each format will contain two-hundred frames.

Figure 16:
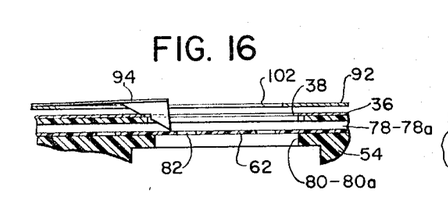
FIG. 16 is a section on the line 16—16 of FIG. 7, but with the parts in a position ready to advance the film.
Figure 17:
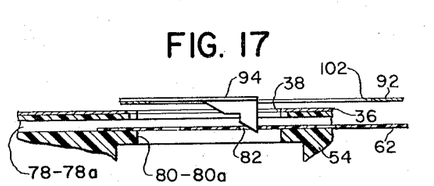
FIG. 17 is a similar section showing the parts in different positions.

FIGS. 16 and 17 show fundamentally the manner in which the film is advanced by means of the film transport mechanism, utilizing the center row of perforations 82. It will be noted that the perforations 82 are spaced apart on the order of the length of a frame; that is, as measured lengthwise of the film. The other dimension of the frame will hereafter be referred to as its height.

In the two figures referred to above, as well as in FIG. 7, a portion of the transverse part 54 of the magazine is shown, together with the associated aperture 80-80a and film guide or track 78-78a, a portion of the film 62, and a portion of a transport plate 92 and a transport pawl 94. By means that will be presently described, the transport plate, together with the pawl 94, is reciprocated on advance and retract strokes. On the advance stroke, illustrated in the left hand view (FIG. 16), the pawl 94 is initially out of engagement with a perforation 82 of the film 62, but as it moves to the right, as seen in the drawing, its bias causes it to enter a film perforation 82 so that its continued movement to the right advances the film one frame. It is intended in this—the projection position—that the picture on one frame of a selected sequence (in this case the lower sequence B) will be projected to the screen 28. The mechanism is so timed and arranged that the pawl 94 must return to the left before it starts another advance stroke. As the pawl does this, the bias therein enables it to ride out of the aperture 82 with which it was engaged, because of the ramp-shaped nose on the pawl so that it does not return the film. On its next advance stroke, it picks up another perforation 82 and advances the film another frame and so on. This frame-by-frame advance continues until the sequence is shown, the film being unrolled from the left and wound or rolled up at the right of the rear part of the magazine 44. When the sequence runs out, the performations 82 run out shortly thereafter and the film cannot be completely forced from one side of the magazine to the other. As previously described, the magazine may then be inverted, placing the rolled-up end of the film at the left hand side of the machine for advance from left to right, only this time the other format will be shown. The previous description covers the manner in which the other film 64 may be similarly handled.

The transport plate 92 is mounted on the rear wall 36 (previously described) in any suitable manner, such as by the provision of grooved studs or pins 96 projecting rearwardly from the wall and receiving slots 98 in the plate 92. The resilient mounting of the pawl 94 on the plate 92 may be accomplished likewise in any suitable manner. Here, this is done by giving the pawl relatively substantial length and securing it by its end opposite to its film-engaging end as by rivets 100. The plate 92 has a substantially central rectangular aperture 102, which is of sufficient size to remain always in register with the front wall aperture 38 through which passes the optical or projection axis, shown here at O—O. This axis also appears in FIGS. 6, 7, and 9.

Figure 22:
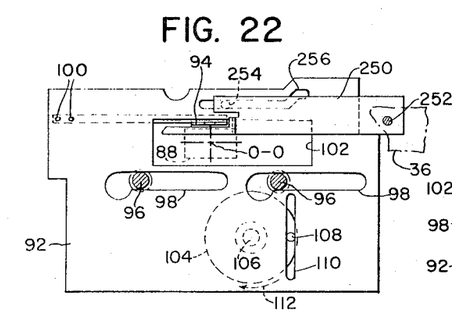
FIG. 22 is a section as seen generally along the line 22—22 of FIG. 9.
Figure 23:
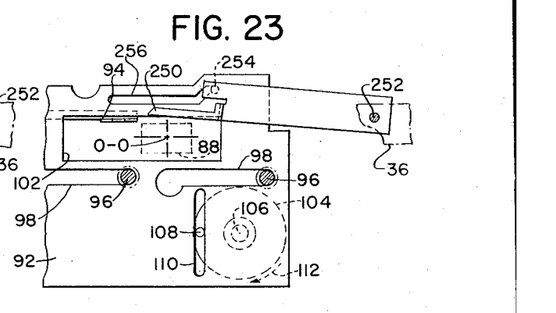
FIG. 23 is a similar view but shows the parts in different positions.

The fundamental principle of effecting reciprocation of the plate 92 is that of a Scotch yoke, here comprising a rotatable member or disk 104 keyed to a fore-and-aft shaft 106 and having a crank pin 108 which engages in a vertical slot 110 in the plate 92. The shaft 106 and wheel or disk 104 are mounted to rotate uni-directionally in a clockwise direction as seen from the front (arrow 112). However, this rotation is controlled so that it occurs normally in successive cycles of 180°. Each of these cycles causes one stroke of reciprocation of the transport plate. The position of the parts in FIG. 22 is such that the transport plate 92 is to the right (as seen from the front of the machine) or in its projection position. This corresponds with the showing in FIG. 17. FIG. 23 shows the plate 92 moved back on its retract stroke and the shaft 106 has turned through 180°, but the picture is still projected because of the size of the opening 102 as respects the opening 38 and frame, here 88. The difference in the two positions can be seen by comparing the positions of the slot 110 with the optical axis O—O.

The manner of driving and controlling the shaft 106 will now be described. See FIGS. 6 and 9.

The rear portion of the casing 20 in the upper region thereof as bounded by the upper portions of the side walls 22 and 24, the transverse intermediate wall 36 and the upper portion of the rear wall 26 defines a compartment 114 closed at its bottom by a floor 116 (FIG. 9) and which contains a power package or unit identified generally by the numeral 118. This power package comprises essentially a secondary casing or frame 120 which is removably secured to the floor 116 as by a plurality of screws 122, accessible from the bottom when the casing 20 is in its FIG. 3 position, for example. The frame or secondary casing 120 has a transverse front wall 124, a transverse rear wall 126, opposite side walls 128 and a bottom 130 which carries a socket for an incandescent lamp 132. This furnishes the light source for the optical system, another component of which is a condenser 134 mounted on the front wall 124 and centered on the optical axis O—O to direct light through the previously described apertures 102 and 38 to the interior of the island 42, within which is located a lens 136 just rearwardly of a mirror 138. The lens 136 includes a casing carried on the upper deck 30, whereas the island 42 is part of the plate means 58 and thus is movable fore-and-aft relative to the deck 30 and lens 136. The forward portion of the deck 30 is slotted at 140 and a stud 142, carried by the plate 58 and island 42, extends through this slot to guide the island and plate 58 for fore-and-aft movement. The upper portion of the island is slotted at 144 and is guided by a rotatable shaft 146 which extends upwardly from the casing of the lens 136 and which is equipped with a knob 148 which may be rotated to adjust the lens as to focus. Any suitable form of adjustment may be provided, the details of which are not material here. It will be understood that this adjustment varies the focus of the lens. The purpose of mounting the island 42 for fore-and-aft movement is to enable the magazine 44, when mounted on the island, to be shifted toward and away from the front wall 36. For example, in FIG. 9, the dot-dash outline of the magazine 44 shows the magazine in its forward position; that is, shifted away from the wall 36. In FIG. 7, the magazine 44 is shown as having been shifted to the rear. It will be seen from FIG. 7 that the perforation 82 in the film is engaged with the transport pawl 94. It follows, therefore, that when the magazine and island are shifted forwardly, the film will clear the pawl so that the magazine may be removed without catching the film on the pawl.

The front wall 124 of the secondary housing 120 has, of course, a rectangular aperture 150 therein (FIG. 7) which is centered on the optical axis O—O. Thus, the light is directed through the condenser 134 and lens 136 to the mirror 138, from which it is directed downwardly and rearwardly to another mirror 152 located on a downward and forward extension 154 of the casing floor 116. The mirror 138 is appropriately supported by an upward extension of the deck 30 and the deck and plate 58 are open at 156 to enable transition of the light from the mirror 138 to the mirror 152 and thence to the interior or rear face of the screen 28, thus giving a "folded" optical path.

Figure 6:
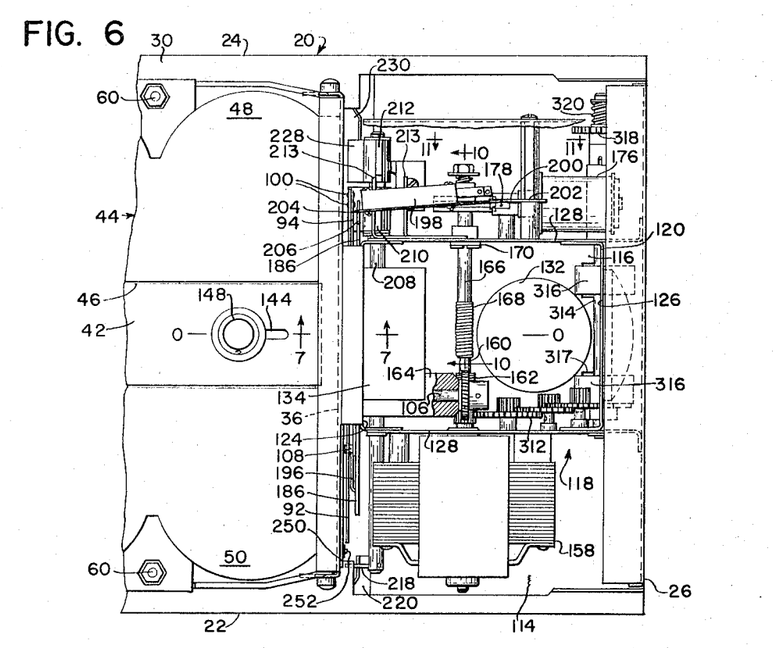
FIG. 6 is a fragmentary plan view, drawn to an enlarged scale and with parts removed, to reveal the power package and portions of the controls.

FIG. 6 shows the compartment 118 and power package with the rear cover 34 of the casing removed, which is done here to reveal the interior components of the power package or unit. The left hand wall 128 of the secondary housing carries thereon, in any suitable manner, a power source, herein the form of an electric motor 158 having a drive shaft 160 which extends transversely to effect a worm and gear connection 162 with the rear end of the Scotch-yoke shaft 106, previously described as carrying the rotating member 104. The shaft 106 is appropriately journaled in a bearing sleeve 164 carried on the wall 124. As the motor 158 is energized, the shaft 106 is rotated unidirectionally as previously described. As will appear subsequently, the motor is energized and deenergized to effect the previously described cycles of operation, each cycle including one-half revolution of the crankshaft 106.

Figure 10:
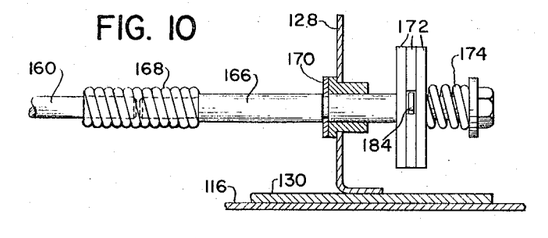
FIG. 10 is an enlarged section on the line 10—10 of FIG. 6.
Figures 11, 26:
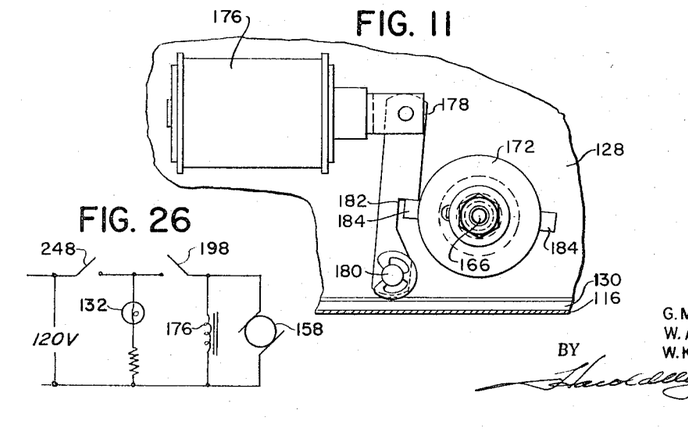
FIG. 11 is an enlarged fragmentary elevation as seen substantially along the line 11—11 of FIG. 6.
FIG. 26 is a schematic wiring diagram.

FIGS. 10 and 11 show a means for controlling the motor so as to prevent over-run thereof when it is deenergized. This means comprises a shaft 166 coaxially connected to the motor shaft 162 as by a coil spring coupling 168 and appropriately supported by a bearing 170 in one wall 128 of the power package. A plurality of friction disks 172 are coaxially mounted on the shaft and spring-loaded at 174, it being clear that the two outer disks may be keyed to the shaft while the inner disk is free. The spring load tends to connect the three disks for rotation in unison.

When the current to the motor 158 is cut off, it is also cut off to a controlling solenoid 176 which therefore results in the braking position of a control arm 178, pivoted at 180 to the housing 120 and having a notch 182 which is selectively engageable with diametrically opposed lugs 184 on the center disk 172. When the motor is energized, so is the solenoid 176, resulting in counterclockwise swinging of the arm 178 so as to free one of the lugs 184 from the arm notch 182. After the crankshaft 106 turns one-half revolution, the motor and the solenoid are deenergized, by means to be described later, causing the arm 178 to return to its FIG. 11 position, whereupon the notch 182 is in position to engage a lug 184. More than one lug 184 is provided to assure adequate braking action in less than 360° after the brake arm 178 is released. The coupling 168 not only affords a cushioned connection but also accommodates any misalignment so far as concerns coaxiality. The solenoid 176 may be mounted in any appropriate manner in the power package. It will be understood that any form of braking means may be utilized.

Figure 20:
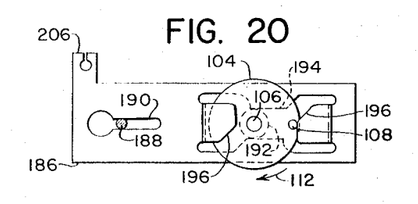
FIG. 20 is a view taken generally on the line 20—20 of FIG. 9.
Figure 21:
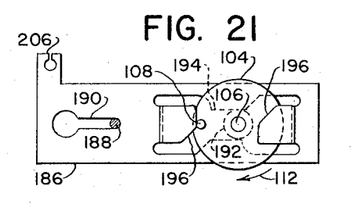
FIG. 21 is a similar view but shows the parts in different positions.

Energizing and deenergizing of the electric motor 158 could be made to depend upon the positions of the transport plate 92, except that the motion of this plate at either end of its stroke is so slow that there would be an undesirable lack of accurate timing, because of the requirement that the motor be cut off just as the transport plate reaches its final position at one end or the other of its reciprocation. To avoid this undesirable result, the invention provides switch control means for attaining proper deenergizing of the motor. This is best illustrated in FIGS. 20 and 21 as comprising a switch control plate 186 carried by the forward wall 124 of the power package. One means of support comprises a grooved stud 188 projecting forwardly from the wall 124 and received by a slot 190 in the plate. Another supporting means comprises a bushing 192 coaxial with the shaft 106 and received by a somewhat wider slot 194 in the plate 186. Thus, the plate 186 is carried for reciprocation along a line parallel to the line of reciprocation of the transport plate 92. FIG. 7 shows that the switch control plate 186 is located just rearwardly of and at a level below the transport plate, but the two plates are not interconnected and therefore are capable of moving independently of each other; although, both are driven by the rotary member 104. This member does not appear in FIG. 7 because the section line is taken to the left of the center line of the shaft 106.

In order that the switch plate 186 may have the desired motion, it is provided with a pair of cams 196, which are diametrically opposed as respect a transverse horizontal diameter through the shaft 106. Considering now the positions of the parts as shown in FIG. 20, it will be seen that the crank pin 108 is to the right, which means that the plate 186 is also to the right. As the disk or rotary member 104 turns in its clockwise direction (arrow 112) the pin 108 approaches the opposite cam 196 and starts movement of the switch plate 186 to the left, the ultimate position of which is shown in FIG. 21. The design of the cam 196 is such that the switch plate is accelerated to its leftward position as the crankpin 108 reaches dead center (on a horizontal line). As the pin 108 assumes its temporary stationary position of FIG. 21, it clears the cam 196 so that it is in position to engage the opposite cam 196 as it rotates through its next half turn, thereby shifting the plate 186 to the right, again accelerating the action of the plate in the attainment of its rightward position. As best seen in FIG. 7, the cams 196 are displaced forwardly from the general plane of the plate 186 so that the rotary member 104 can be accommodated. The pin 108 extends forwardly and engages only the cams 196 and not other portions of the configuration of the generally H-shaped slot in the plate 186. This will be clear from FIG. 6.

The manner in which the motion of the plate 186 is utilized to make and break the circuit to the motor 158 exploits the use of a normally bias-closed switch 198 carried by the forward end of a leaf spring 200, the rearward end of which is anchored to the outer side of the power package (FIG. 6). Thus, the switch 198 is capable of being shifted laterally between right and left positions. The leaf spring 200 has a forward extension 204 which effects a connection with a slotted ear 206 at the left hand end of the control plate 186 (FIGS. 6, 20 and 21). Thus, as the control plate 186 reciprocates back and forth, it changes the position of the switch 198.

Figures 12, 13:
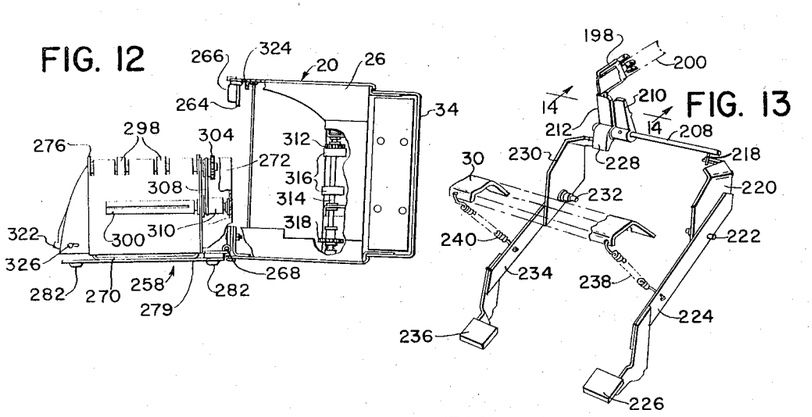
FIG. 12 is a small-scale rear view of the machine as it appears in FIG. 3.
FIG. 13 is a perspective, on a reduced scale, of the control for the transport mechanism.
Figure 14:
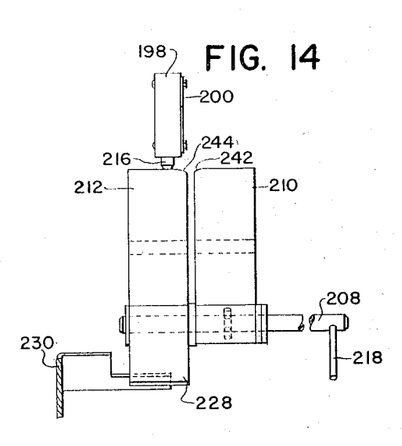
FIG. 14 is an enlarged front view as seen generally along the line 14—14 of FIG. 13.
Figure 15:
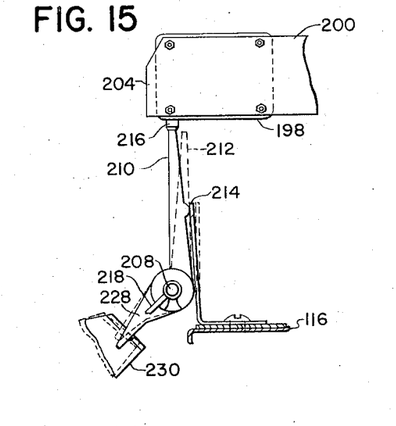
FIG. 15 is a side elevation of the structure shown in FIG. 14.

For the purpose of controlling the switch 198, the casing carries a transverse rock shaft 208 which spans the casing side walls. A first control arm 210 is keyed to the shaft 208 just short of its left hand end, and a second control arm 212 is loosely mounted on the extreme left end of the shaft. Both arms 210 and 212 are biased forwardly against suitable stops 213 (FIG. 6), as by springs, one of which appears at 214 in FIG. 15. Any suitable form of biasing means may be used. When both arms 210 and 212 are in their forward positions, they are in transverse alinement (FIG. 13). The relative heights of the arms with respect to the switch 198 are such that when the switch 198 is directly over either arm, its switch button 216 is forced upwardly against an internal spring load (not shown). The switch may be of any known construction and closes when either of the arms is moved away from the button 216 so that the button may move downwardly to close the circuit to the motor 158. FIG. 14 shows one open condition of the circuit, with the switch 198 directly above the arm 212 and the button 216 pressed upwardly. A second position of the switch 198, still in open condition, would occur with the switch 198 directly above the other arm 210, the button 216 again being pressed upwardly to break the circuit.

The rock shaft 208 has at its right hand end a depending pin 218 which is engaged by an arm 220 formed as part of a bell crank pivoted on the casing at 222 and having a second arm 224, the forward extremity of which is in the form of a control button 226 located adjacent to the screen 28 and to the right thereof. The other switch control arm 212 has a depending ear 228 which engages an arm 230 of a left hand bell crank pivoted on the casing at 232 and including an arm 234 which terminates at its front end as a second control button 236 located in transverse alinement with the button 226 but at the left hand side of the lower portion of the screen 28. The pivot pins 222 and 232 are here coaxial and may be carried by the respective side walls of the casing in any suitable manner. In addition to the springs 214, further springs may be provided at 238 and 240, connected between the arms 224 and 234 and interior forward portions of the casing deck 30 (FIG. 13), to assure return of the arms 224 and 234 to "up" positions as respects the relationship of their buttons 226 and 236.

By way of observing the operation of the switch control mechanism to the extent described, let it be assumed that the following occurs: Both control arms 210 and 212 are in their forward positions, with the switch 198 directly over the arm 212 so that the switch button 216 is depressed, and the circuit to the electric motor 158 and solenoid 176 is open; the transport plate 92 and pawl 94 are in their FIG. 16 positions; the position of FIG. 23 will also obtain as respects the transport plate; the switch control plate 186 will be in its FIG. 21 position, and thus the slotted ear 206 on the plate 186 will correspond with the leftward position of the control switch 198 as in FIG. 14. The operator now depresses and releases the button 236, which results in rocking of the bell crank 230–234 on its pivot 232, causing rocking of the arm 212 in a clockwise or rearward direction, as indicated in broken lines in FIG. 15, which has the effect of removing the arm 212 as a support from beneath the switch button 216, whereupon the button snaps downwardly to its closed position, thereby completing the circuit to the electric motor 158 and solenoid 176. The motor starts turning and the solenoid withdraws the brake arm 178 from the path of the lugs 184 on the center of the three disks 172. The rotary member 104 turns in the direction of the arrow 112 (clockwise as seen from the front) so that the pin 108 moves from its FIGS. 21 and 23 position toward the positions of FIGS. 20 and 22. In other words, the transport pawl 94 now moves from FIG. 16 toward the FIG. 17 position, transporting the film through a one-frame increment. So far as respects the switch control plate 186, the crank pin 108 travels freely from the position of FIG. 21 to a position just short of that attained in FIG. 20, at which time it encounters the right hand cam 195. In the meantime, the switch 198 remains closed and the circuit is still completed. Ultimately, and just prior to completion of 180° revolution of the member 104, the pin 108 encounters the cam 195 and accelerates the switch control plate 186 to the position of FIG. 20. As the switch plate moves to the right, it carries with it the switch 198, and the arm 210, maintaining its original position under its spring load (and not having been depressed) is in the path of the switch button 216. A ramp or rounded corner 242 on the arm 210 enables the button 216 to ride up onto the top of the arm, thus forcing the switch 198 to open and to break the electrical circuit. As this occurs, the motor of course stops, and the solenoid effects engagement of the brake arm 178 with the brake mechanism.

As previously described, the transport pawl 94 must return to its FIG. 22 position before another frame of film can be advanced. To accomplish this, it is necessary to depress the right hand control button 226. At this point, the switch 198 is now directly above the right hand arm 210 and the switch button 216 is pressed upwardly to open the circuit. However, as the right hand button 226 is depressed, the bell crank 220–224 is rocked about its pivot 222 so as to swing the arm 210 rearwardly and thus remove it as a support for the switch button 216, whereupon the button snaps downwardly and closes the circuit to the motor. The rotary member 104 now moves from its FIG. 20 position toward its FIG. 21 position and ultimately the pin 108 encounters the left hand cam 196, causing the switch control plate 186 to shift to the left, the ear 206 riding up on a ramp or corner 244 on the other arm 212, again opening the switch and breaking the circuit.

Thus, so long as the control buttons 226 and 236 are alternately depressed, the mechanism will operate in the 180° cycles as described. That is to say, the transport pawl 94 will move from its retracted position to its advancing position when the advance button 236 is depressed. This results from the fact that one or the other of the control arms 210 and 212 is always in position to break the circuit, because of its effect on the switch button 216. It follows, however, that if both buttons 226 and 236 are depressed and held in depressed positions, both arms 210 and 212 are removed as obstacles to the switch button 216 and therefore the circuit will continue energized to the motor 158 so that the motor continues to rotate and the switch 198 swings back and forth as the switch control plate 186 continues to reciprocate. This function is useful in advancing film rapidly from left to right, or for rewind purposes, in which latter case the magazine is removed and replaced in inverted position right to left.

Figure 2:
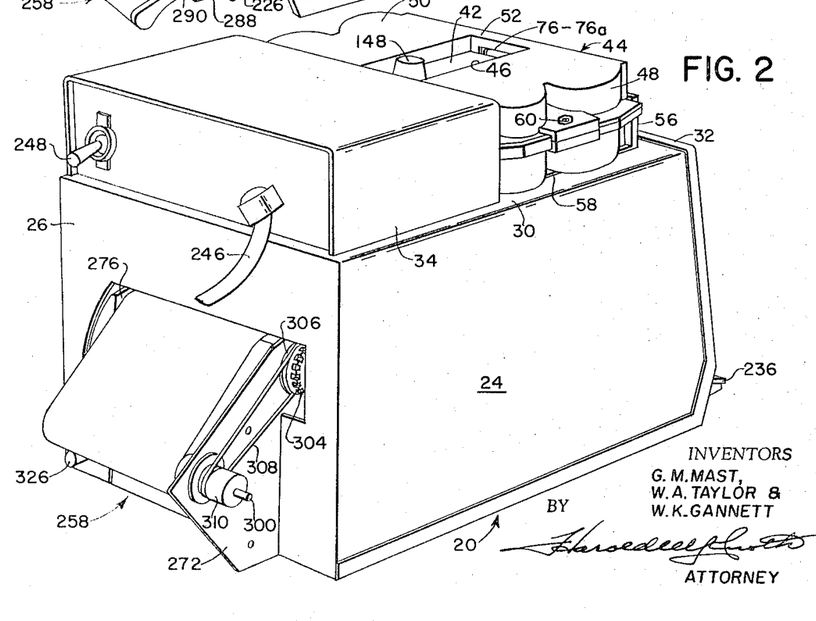
FIG. 2 is a perspective showing the machine from the rear end opposite side.

The electrical circuit is shown schematically in FIG. 26. FIG. 2 illustrates a main electrical inlet cord 246, which may be connected to the electrical power source, and an on-off switch 248.

It is a further feature of the invention to mask and unmask portions of each frame of film as it is projected.

As brought out in the previous description, and having particular reference to FIGS. 7 and 18, only the lower row of frames is alined with the optical axis O—O. For example, format B will be projected in FIG. 7. That is to say, the frames in format B are sequentially registered with the axis O—O. Stated otherwise, only the lower half of the opening 74, 76 is utilized at this time. At this point it must be observed that the aperture 38 is effectively delineated at its top by the bottom edge of the film control lip 40. Hence the aperture 38 is but slightly greater in height than a frame contained in either sequence A or B.

Figure 24:
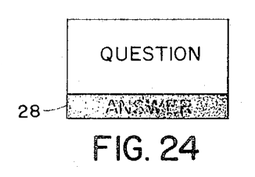
FIG. 24 is a schematic representation of the picture seen on the screen when the answer mask is in covering position.

Since the projection system here requires inversion of the picture before it reaches the screen, it will be the upper half of each frame that is masked and unmasked. For this purpose, a mask member 250 is used to cover and uncover the top portion of the usable aperture. In this case, such portion is approximately one-third of the height of the usable aperture. The mask is in the form of an arm pivoted at 252 to the right hand side of the wall 36 so as to lie just ahead of the transport plate 92. The mask member is controlled by the transport plate 92 and for this purpose the mask member has thereon a guide pin 254 which rides in a zig-zag slot 256 in the transport plate. FIG. 22 shows the mask member 250 in a horizontal position such that it blocks the upper portion of the usable aperture, the pin 254 being now in the lower elongated portion of the transport plate slot 256. The transport pawl 94 will be in the position of FIG. 17, from which figure the mask member has been omitted in the interests of clarity. This is the projection position, and a frame projected to the screen 28 will arrive at the screen in the condition shown in FIG. 24. Assuming that the frame includes a question and an answer, the mask 250 will cover the answer portion so that only the question is visible. This is represented in FIG. 24 by the appearance of the word "question" in full lines and the word "answer" in dotted lines in a shaded area. This condition of the parts will be accomplished by depressing the left hand or advance button 236, according to the procedure previously described. Since it is assumed that the right hand or answer button 226 has not been depressed, the motor will stop and the parts will remain as in FIGS. 17, 22 and 24.

Figure 25:
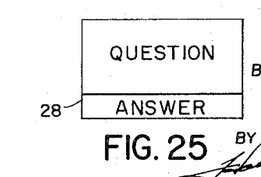
FIG. 25 is a similar view showing the picture as it would appear with the answer mask in uncovering position.

It has already been described that the transport plate and pawl unit 92–94 is retracted without moving the projected frame of film. However, the retraction or return stroke of this unit does control the mask member 250, since when the plate 92 is returned to the left, the slot 256 therein causes the mask member pin 254 to ride to the upper or short portion of that slot (FIG. 23), thus pivoting the mask member 250 upwardly about its pivot 252 and thereby uncovering the rest of the usable aperture and resulting in exposure of the "answer" portion of the frame on the screen 28 (FIG. 25). Broadly, the mask means is interposed in the path of the light source and could be located otherwise than at the position illustrated, as at the screen 28, for example, within the spirit and scope of the invention. The significant thing is that the mask is rapidly actuated and timed with projection of the film and retraction of the pawl 94 without disturbing the film so that a portion of the projected image is blocked and unblocked to present the question without the answer and then to expose the answer without advancing another frame of film, which considerably simplifies the procedure and results in substantial film economy.

Figure 3:
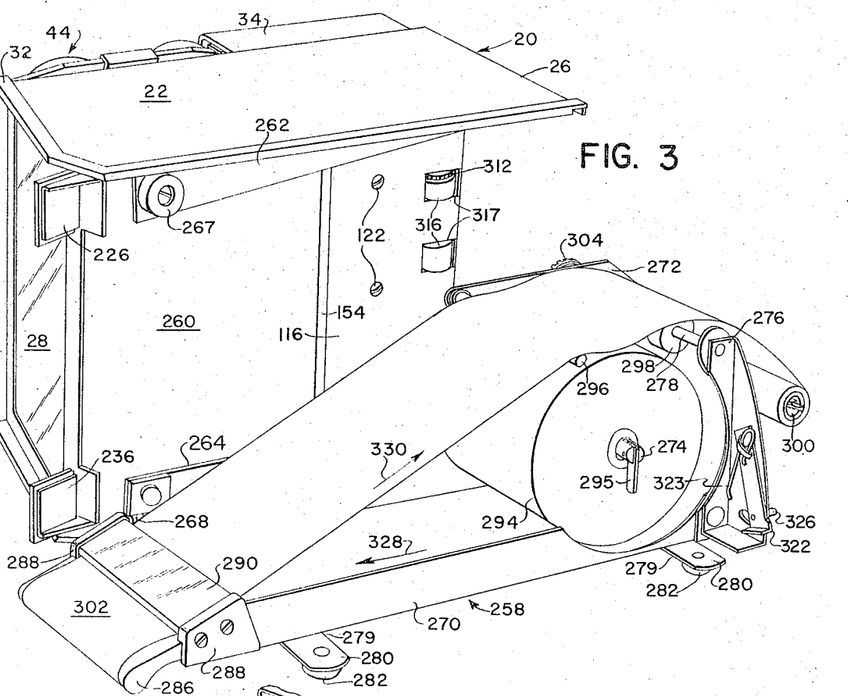
FIG. 3 is a perspective showing the machine opened to reveal the paper mechanism.
Figure 8:
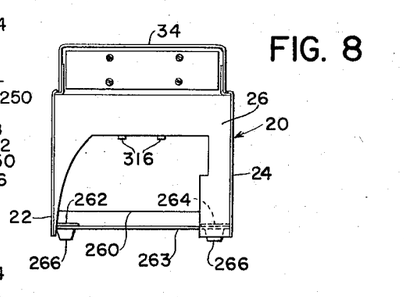
FIG. 8 is a rear view, on a materially reduced scale, showing the appearance of the machine without the paper mechanism.

It is a further feature of the invention to provide means associated with the casing 20 for recording or otherwise indicating the user's answers to the questions, for example, projected to the screen 28. Broadly, this means may be any medium capable of receiving recording indicia. For purposes of exposition, and on the basis of a commercially acceptable model, the medium is paper, carried by what is referred to herein generally as a paper tray, identified in its entirety by the numeral 258. As previously described, and as best shown in FIGS. 3 and 9, the bottom of the casing per se may be regarded as closed by the floor 116, inclined portion 154 and adjoining forward portion 260, so that the paper tray is substantially separated from the rest of the casing, whereby the casing may be assembled and used with or without the paper tray. The side walls 22 and 24 are bordered respectively by supporting strips 262 and 264, which, when the casing is used without the paper tray 258, as shown in FIG. 8, may mount a plate or floor 263 equipped with rubber feet 266 when the machine is used without the paper tray. However, as shown in FIG. 12, when the casing is used with the paper tray 258, the plate 263 is not used and the strip 264 is equipped with hinge means 268 on a longitudinal axis 268 by means of which the casing is hingedly and, if desired, separably connected to the paper tray. The front portion of the strip 262 then carries a rubber button 267. A rear button on the same side is not needed because of a latch between the paper tray and the casing, as will appear later.

The paper tray itself includes a longitudinal main frame 270 of channel construction, having at its left hand rear portion an upstanding side wall 272 which mounts a paper-supply spindle 274. At its opposite side, the frame 270 has rigid thereon an upstanding support 276, and a cross shaft 278 is journaled between the upper end of the support 276 and the coaxial portion of the wall 272. The left hand side of the frame 270 is connected to the left hand side of the casing 20 by the hinge means providing the hinge 268, and the frame itself has a pair of lateral members 279 which extend at opposite sides as ears 280 equipped with rubber feet 282 (FIGS. 3 and 12). The frame 270 is long enough so that it projects at its forward end beyond the screen 28, here in the form of a guide or platen 286, which is disposed between the two buttons 226 and 236 for controlling the mechanism of the system. The parts are attractively and symmetrically arranged (FIG. 1).

Just rearwardly of the platen 286, opposite sides of the frame 270 carry upstanding members 288 which in turn support a transparent plate or window 290, which is just uphill from the platen. The platen 286 is spaced above the forward portion of the floor of the frame 270, as at 292 (FIG. 9), for a purpose to presently appear.

The particular type of paper used, as a matter of preference, is conventional adding machine tape, a roll of which is shown at 294, carried by the spindle 274 which is equipped with any conventional type of retainer 295 to keep the paper in place. The paper is threaded through the space or opening 292, around the platen 286, under the window 290 and back over a paper support 296 and thence over rubber rolls 298 carried by the shaft 278. Any suitable friction means may, if desired, be used in the area of the space 292, to retard the paper so as to keep it taut between the platen 286 and rolls 298. The paper is thence extended rearwardly to a take-up spindle 300 supported by the rearward wall 272. In the portion of the paper that extends between the platen 286 and the support 296, a bend will occur at the junction of the mirror support 154 and floor 260 of the casing 20 when the casing is in its closed position (FIG. 9). In extending the paper from the roll 294 to the forward end of the machine and then back again, the paper is threaded through the space 292, thence beneath and thence back over the platen 286 and under the window 290, it being noted that the window is forward of the screen 28 and thus visible at the front of the machine, as is that portion in the area 302 just ahead or downhill of the window 290.

As best seen in FIGS. 3 and 12, the left hand end of the shaft 278 carries thereon a gear 304 for purposes to presently appear. Also fixed to the shaft 278 adjacent to the gear 304 is a pulley 306 (see also FIG. 2) which is belt connected at 308 to a pulley 310 on the right hand end of the take-up spindle 300.

The paper is advanced incrementally with operation of the motor to advance the frames and expose the answer of whichever film is being projected. In addition, the take-up spindle 300 is driven by means of the belt connection at 308. Power for advancing the paper is derived from the motor 158 by means of a gear train 312 (FIGS. 6 and 9) driven from the motor shaft 160 to drive a transverse shaft 314 which is equipped with rubber rollers 316 which protrude through opening 317 in the floor 116. At the extreme left hand end of the drive shaft 314 is an axially spring-loaded gear 318 (FIGS. 6 and 12) which is adapted to mesh with the gear 304 when the casing is closed over the paper tray. In this position of the casing and tray, the portion of the paper that extends rearwardly over the rubber rollers 298 on the shaft 278 extends beneath the rollers 316 on the casing shaft 314 so that the paper is pinched or engaged therebetween. The gear 318 is axially shiftable on, though rotatable with, the shaft 314 and is backed up by a spring 320 so that in the event that the gears 318 and 304 do not mesh immediately upon closing of the casing, the gear 318 can shift temporarily, ultimately meshing with the gear 304 as soon as rotation is imparted to the gear 318. Since the belt pulley 306 is also keyed to the shaft 298, it will be driven when the shaft is driven via the gears 318 and 304 and will, via the belt 308, drive the take-up spindle 300. Slippage in the belt will accommodate changes in diameter of the paper as it is wound on the take-up spindle 300 but otherwise the arrangement is such that the paper will be kept adequately taut and under control.

The rear support 276 on the paper tray 258 carries a latch 322, biased outwardly by a spring 323 (FIG. 3), which is engageable with a lug 324 carried on the interior of the right hand side wall 22 of the casing when the casing is closed over the tray. A pin or stud 326 is carried by the latch 322 and projects rearwardly as a convenient handle for controlling the latch to release same when it is desired to swing the casing to the position of FIG. 12.

*Operation*

The operation of the film transport means, together with the answer mask, has been covered above and need not be separately repeated. Further description thereof in connection with the paper tray, however, is deemed to be in order.

Now, with the casing 20 closed over the paper tray and the paper threaded around the platen 286 and back under the window 290, and the advance button 236 having been pressed once to advance a film frame to projection position, a portion of clean paper will be presented in the area 302 just ahead of the window 290. If the particular film format being projected is of the question-answer type, the user will see on the screen a picture such as represented by FIG. 24; that is, the question will appear but the answer will be masked or blocked. The theory of operation is that the user will now write his answer on the paper area at 302, the upper surface of the platen of course serving as a surface to support the paper while it is being written upon. To check his answer against the correct or projected answer, the user now depresses the answer button 226, resulting in retraction of the transport pawl 94 along with the transport plate 92, causing the plate to move from its FIG. 22 position to its FIG. 23 position, thus pivoting the mask 250 upwardly so as to expose the "answer" portion of the film frame. The user will now see a completely projected frame such as suggested by FIG. 25. Since the motor 158 must turn the crankshaft 106 through a half revolution as it retracts the transport plate 92 and pawl 94, it follows that it will also drive the gear train 312 and this, via the gearing 318–304 and rubber rollers 316, will cause the paper to advance a corresponding increment, it being understood that the paper is unwound from the bottom of the roll (arrow 328) and advances incrementally uphill (arrow 330). Thus, it will be seen that whatever was written on the paper area at 302 will now move under the window 290 where it can be seen but where it cannot easily be altered. At the same time, a fresh area of paper will be presented at 302 on which the user may, if he so desires, copy the correct projected answer. When the advance button 236 is depressed to advance the next frame to projecting position, the paper area on which the correct answer was just written will advance under the window 290 and a fresh area will appear at 302. In short, the paper is advanced incrementally with each advance and retraction of the transport plate.

It will be clear that if both buttons 236 and 226 are depressed simultaneously and held the motor 158 will run continuously, for reasons previously described, and the paper likewise will be advanced continuously. If it is desired to rewind a film, for example, or to advance same to a predetermined series of frames, the casing may be opened slightly so that the drive from the gear train 312 to the shaft 298 is disconnected, whereby film movement may be obtained without paper advance. Actually, since the latch 322 is spring-loaded to the positions of FIGS. 3 and 8, it will hold the casing slightly open, with the rolls 316 clear of the paper over the rolls 298.

It will further be seen that the power package and a portion of the optical system are self-contained in the casing 20, along with the drive gearing 312 and associated parts, thereby making it a simple design expedient to furnish the casing alone or in conjunction with the paper tray. Removal of the paper tray will not in any respect affect the optical system or power package. The structure is otherwise relatively simple, considering the task that it performs, and the components are so constructed and arranged as to be highly reliable, compact and trouble-free. Since the power package is a separate unit, it may be removed and replaced without disturbing the other mechanism. For this purpose, the cover 34 may be made easily removable to provide access to the power package or "chimney" for adjustment, replacement and/or repair.

Features of the invention other than those categorically enumerated will readily occur to those versed in the art, as will many modifications and alterations in the preferred embodiment disclosed, all of which may be achieved without departure from the spirit and scope of the invention.

What is claimed is:

1. Projection apparatus, comprising: a casing including a viewing screen receivable of light from within the casing and viewable from outside said casing; film-handling and projection means on the casing for projecting film frames to the interior face of the screen and including film-transport mechanism for advancing film frame-by-frame; a support exteriorly of the casing and adjacent to the screen; a driven element carried by and within the casing in spaced relation to the support; guide means in the casing leading from the interior of said casing to said support; a supply spindle within the casing for carrying a roll of strip-like supplementary material leading from the roll through the guide means, about the support and back through the guide means to and in engagement with the driven element; drive means carried by the casing for driving the film-transport mechanism and said driven element to advance the film and said material; and control means connected to and for selectively starting and stopping said drive means.

2. The invention defined in claim 1, including: a take-up spindle carried by the casing for receiving and rolling up material from the driven element; and means operated by the drive means for rotating said take-up spindle.

3. The invention defined in claim 2, in which: the means for rotating the take-up spindle includes a slip device to accommodate the increasing diameter of the material as it rolls up on the take-up spindle.

4. The invention defined in claim 1, in which: said casing includes an upper part, a bottom separable from said upper part, and said support, driven element, guide means and supply spindle are carried by said bottom independently of said upper part, and said driven element includes a separable drive connection to the drive means.

5. The invention defined in claim 4, in which: said upper part and bottom are interconnected by a hinge enabling swinging of said upper part toward and away from closed and open positions, respectively, relative to said bottom.

6. Projection apparatus, comprising: a casing including a viewing screen receivable of light from within the casing and viewable from outside said casing; film-handling and projection means on the casing for projecting film frames to the interior face of the screen and including film-transport mechanism having a reciprocable member movable on alternate advance and return strokes and being one-way engageable with the film on its advance strokes for advancing film frame-by-frame to a projection condition and operative on each return stroke to leave the advanced film in said projection condition and to become itself conditioned to reengage the film for the following advance stroke; mask means carried by the casing and changeable between masking and unmasking conditions respectively blocking and unblocking projection of a full frame to the screen; first control means operative on the transport mechanism and mask means to move said member on an advance stroke to advance the film one frame to said projection condition and to simultaneously incur said masking condition; and second control means operative subsequent to said first control means for moving said member on its return stroke and for changing the mask means to its unmasking condition as a condition precedent to further operation of said first control means.

7. The invention defined in claim 6, including: a support on the casing adjacent to the screen; means on the casing for carrying supplementary material to move in traversing relation to the support; means operative upon successive alternate operations of the first and second control means for presenting successive portions of the material to the support in timed relation with film advance; and means operative responsive to operation of the second control means for limiting viewer access to the material portion presented at the support by the next preceding operation of the first control means.

8. Projection apparatus, comprising: a casing including a viewing screen receivable of light from within the casing and viewable from outside said casing; film-handling and projection means on the casing for projecting film frames to the interior face of the screen and including intermittently operable film-transport mechanism for advancing question-and-answer film frame-by-frame to a projection condition; said mechanism including a reciprocatable member operative on alternate advance and retract strokes and engageable with and disengageable from the film respectively on said advance and return strokes; mask means carried by the casing and changeable between a masking condition permitting projection of a question portion of a frame but blocking projection of a corresponding answer portion of such frame to the screen and an unmasking condition enabling projection of both question and answer portions of a frame to the screen; means interconnecting said member and mask means to achieve said masking and unmasking conditions respectively on said advance and return strokes; energizible and deenergizible drive means connected to and for reciprocating said member; first control means for energizing said drive means through a cycle incurring one advance stroke of said member to project a question while masking its answer; and second control means for energizing said drive means through a succeeding cycle incurring one retract stroke of said member to retain projection of said question portion while exposing said answer portion whereby film is incrementally advanced frame-by-frame and each frame is sequentially masked and unmasked while in its projection condition.

9. The invention defined in claim 8, in which: the film-handling and projection means includes a projection aperture past which the film is moved, and said mask means is operative on said aperture.

10. The invention defined in claim 8, including: a support on the casing adjacent to the screen; means on the casing for carrying supplementary material to move in traversing relation to the support; means operative upon successive alternate operations of the first and second control means for presenting successive portions of the material to the support in timed relation with film advance; and means operative responsive to operation of the second control means for limiting viewer access to the material portion presented at the support by the next preceding operation of the first control means.

11. The invention defined in claim 8, in which: the drive means includes a unidirectionally rotatable element and each cycle of said drive means includes a half turn of said element, said element being connected to said member; and means is provided in cooperation with the first and second control means for automatically deenergizing the drive means at the end of each cycle.

12. The invention defined in claim 11, including: brake means operative on said element at the ends of the cycles to prevent over-run thereof past any cycle.

13. The invention defined in claim 11, including: driving connections between the deenergizing means and the rotatable element for operation of said deenergizing means by said element as it approaches the end of each half-turn.

14. The invention defined in claim 13, in which: said driving connections include means for accelerating the operation of the denergizing means to insure accurate timing of the ends of the cycles with the advance and retract strokes of said member.

15. Film handling mechanism for advancing serially-framed film along a film path in frame-by-frame increments for register of successive frames with a projection apertures, comprising: a support; film transport means on the support, including a film drive member reciprocable on film-engaging advance and film-disengaging retract strokes between starting and project positions; drive means connected to and for reciprocating said member and including an electric motor; a switch carrier on the support and connected to the drive means for movement back and forth along a carrier path between first and second positions corresponding respectively to said starting and project positions and including an electric switch normally closed to energize said motor; first and second individually shiftable controllers on the support and spaced along said carrier path normally in and biased to return to initial conditions corresponding respectively to said first and second carrier positions for engaging and for opening said switch; a first operator movable on the support for shifting the first controller to close said switch and energize the motor to incur the advance stroke of said member until said switch encounters and is opened by the initially conditioned second controller whereby to stop said member at its project position; and a second operator movable on the support to shift said second controller for re-closing said switch to reenergize the motor for return of the member to its starting position whereat it encounters and is opened by the first controller in its initial position.

16. The invention defined in claim 15, in which: the controllers lie closely alongside each other along said carrier path and respectively have switch-engaging portions, each having a ramp facing the other controller and up which the switch rides to be opened at the respective starting or project position of said member.

17. The invention defined in claim 15, including: mask means carried by the support for movement relative to the projection aperture between an unmasking position uncovering the aperture and a masking condition partly covering said aperture; and means connecting said mask means to the drive means for incurring said masking and unmasking condition respectively on the advance and retract strokes of said member.

18. The invention defined in claim 15, including: a pivot shaft spaced from and lying generally along the carrier path, and said controllers respectively comprising arms on said shaft and shiftable about the axis of said shaft.

19. Projection apparatus, comprising: a casing including an upper part having front and rear ends and including a forward compartment, an upper rear compartment, and a lower rear compartment and a separable bottom closing said forward and lower rear compartments from below, said forward compartment having a viewing screen receivable of light from within said forward compartment and viewable from the front exterior of the casing; means in the upper rear compartment including a light source for projecting light to the forward compartment and thence to the screen, said means including drive mechanism; film-handling means on the casing upper part for placing film in the light path from said source to the screen; means connected to the drive mechanism for operating the film-handling means; means carried by the bottom and disposed in the lower rear compartment for carrying a supply of strip-like material usable in conjunction with the screen, said last named means including driven mechanism for moving said material adjacently to the screen; and means effecting a separable drive connection between said drive and driven mechanisms.

20. Projection apparatus, comprising: a casing having front and rear ends and including a forward compartment, an upper rear compartment, and a lower rear compartment, said forward compartment having a viewing screen receivable of light from within said forward compartment and viewable from the front exterior of the casing; means in the upper rear compartment including a light source for projecting light to the forward compartment and thence to the screen, said means including drive mechanism; film-handling means on the casing for placing film in the light path from said source to the screen; means connected to the drive mechanism for operating the film-handling means; means in the lower rear compartment for carrying a supply of strip-like material usable in conjunction with the screen, said last named means including driven mechanism for moving said material adjacently to the screen; means effecting a drive connection between said drive and driven mechanisms and a partition in the casing separating said upper rear and lower rear compartments, said partition having an opening therein to accommodate said drive connection.

21. The invention defined in claim 20, in which: the casing has an upper forward part including said forward and upper rear compartments and a lower part including said lower rear compartment, and said two parts are movably interconnected for movement of one part away from the other, and said drive connection includes portions disengageable when said one part is moved away from the other part and reengageable when said one part is moved back toward said other part.

22. Projection apparatus, comprising: a casing including a viewing screen; film-handling and projection means on the casing for projecting film frames to the screen and including film-transport mechanism having a reciprocable member movable on alternate advance and return strokes and being one-way engageable with the film on its advance strokes for advancing film frame-by-frame to a projection condition and operative on each return stroke to leave the advanced film in said projection condition and to become itself conditioned to reengage the film for the following advance stroke; mask means carried by the casing and changeable between masking and unmasking conditions respectively blocking and unblocking projection of a full frame to the screen; first control means operative on the transport mechanism and mask means to move said member on an advance stroke to advance the film one frame to said projection condition and to simultaneously incur said masking condition; and second control means operative subsequent to said first control means for moving said member on its return stroke and for changing the mask means to its unmasking condition.

23. The invention defined in claim 22, including: a support on the casing adjacent to the screen; means on the casing for carrying supplementary material to move in traversing relation to the support; means operative upon successive alternate operations of the first and second control means for presenting successive portions of the material to the support in timed relation with film advance; and means operative responsive to operation of the second control means for limiting viewer access to the material portion presented at the support by the next preceding operation of the first control means.

24. Projection apparatus, comprising: a casing including a viewing screen; film-handling and projection means on the casing for projecting film frames to the screen and including intermittently operable film-transport mechanism for advancing question-and-answer film frame-by-frame to a projection condition; said mechanism including a reciprocatable member operative on alternate advance and retract strokes and engageable with and disengageable from the film respectively on said advance and return strokes; mask means carried by the casing and changeable between masking and unmasking conditions respectively blocking and unblocking projection of an answer to the screen along with its question; means interconnecting said member and mask means to achieve said masking and unmasking means respectively on said advance and return strokes; energizible and deenergizible drive means connected to and for reciprocating said member; first control means for energizing said drive means through a cycle incurring one advance stroke of said member to project a question while masking its answer; and second control means for energizing said drive means through a succeeding cycle incurring one retract stroke of said member to retain projection of a question while unmasking its answer whereby film is incrementally advanced frame-by-frame and each frame is sequentially masked and unmasked while in its projection condition.

25. The invention defined in claim 24, in which: the film-handling and projection means includes a projection aperture past which the film is moved, and said mask means is operative on said aperture.

26. The invention defined in claim 24, including: a support on the casing adjacent to the screen; means on the casing for carrying supplementary material to move in traversing relation to the support; means operative upon successive alternate operations of the first and second control means for presenting successive portions of the material to the support in timed relation with film advance; and means operative responsive to operation of the second control means for limiting viewer access to the material portion presented at the support by the next preceding operation of the first control means.

27. The invention defined in claim 24, in which: the drive means includes a unidirectionally rotatable element and each cycle of said drive means includes a half turn of said element, said element being connected to said member; and means is provided in cooperation with the first and second control means for automatically deenergizing the drive means at the end of each cycle.

28. The invention defined in claim 27, including: driving connections between the deenergizing means and the rotatable element for operation of said deenergizing means by said element as it approaches the end of each half-turn.

29. Projection apparatus, comprising: a casing having an upper part and a separable bottom, said upper part including a viewing screen receivable of light from within the casing and viewable from outside said casing; film-handling and projection means on the upper casing part for projecting film frames to the interior face of the screen and including film-transport mechanism for advancing film frame-by-frame; a support carried by the casing bottom exteriorly of the casing upper part and adjacent to the screen; a driven element carried by the casing bottom; means carried by the casing bottom for carrying a supply of supplementary material movable in traversing relation to the support and engaged by said driven element; drive means carried by the casing upper part for driving the film-transport mechanism and said driven elment to advance the film and to cause said material to traverse said support, said drive means having a separable connection with the driven element; and control means connected to and for selectively starting and stopping said drive means.

30. The invention defined in claim 29, in which: said upper part and bottom are interconnected by a hinge enabling swinging of said upper part toward and away from closed and open positions, respectively, relative to said bottom.

31. Film handling mechanism for advancing serially-framed film along a film path in frame-by-frame increments for register of successive frames with a projection aperture, comprising: a support; film transport means on the support, including a film drive member reciprocable in film-engaging advance and film-disengaging retract strokes between starting and project positions; drive means connected to and for reciprocating said member and including an electric motor; an electric switch normally closed to energize said motor and driven by the drive means to move back and forth along a switch path between first and second positions corersponding respectively to said starting and project positions; first and second individually shiftable controllers on the support and spaced along said switch path normally in and biased to return to initial conditions corresponding respectively to said first and second switch positions for engaging and for opening said switch; a first operator movable on the support for shifting the first controller to close said switch and energize the motor to incur the advance stroke of said member until said switch encounters and is opened by the initially conditioned second controller whereby to stop said member at its project position; and a second operator movable on the support to shift said second controller for re-closing said switch to reenergize the motor for return of the member to its starting position whereat it encounters and is opened by the first controller in its initial position.

References Cited by the Examiner
UNITED STATES PATENTS

| | | | |
|---|---|---|---|
| 2,226,175 | 12/1940 | Merriman et al. | 352—177 |
| 2,487,476 | 11/1949 | Pratt et al. | 88—28 |
| 2,495,528 | 1/1950 | Langan | 88—24 |
| 2,497,606 | 2/1950 | Herrimann | 88—24 |
| 3,100,942 | 8/1963 | Godcharles et al. | 35—9 |
| 3,107,435 | 10/1963 | Skinner | 35—9 |
| 3,126,646 | 3/1964 | Penraat et al. | 35—9 |
| 3,162,959 | 12/1964 | Woolman | 35—9 |
| 3,179,004 | 4/1965 | Stoyanoff et al. | 88—28 |

EUGENE R. CAPOZIO, *Primary Examiner.*

JULIA E. COINER, *Examiner.*

W. W. NIELSEN, *Assistant Examiner.*